United States Patent
Kumano et al.

(10) Patent No.: US 6,763,381 B1
(45) Date of Patent: Jul. 13, 2004

(54) SUPERVISORY CONTROL SYSTEM

(75) Inventors: Satoshi Kumano, Kawasaki (JP); Hideki Maeda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/505,734

(22) Filed: Feb. 16, 2000

(30) Foreign Application Priority Data

Feb. 18, 1999 (JP) .......................... 11-039651

(51) Int. Cl.⁷ ............................ G06F 15/173
(52) U.S. Cl. ..................................... 709/224
(58) Field of Search ................... 709/223–226, 709/206, 217–219; 711/133; 713/202; 714/4

(56) References Cited

U.S. PATENT DOCUMENTS

| | | | | |
|---|---|---|---|---|
| 5,651,006 A | * | 7/1997 | Fujino et al. | 370/408 |
| 6,128,656 A | * | 10/2000 | Matchefts et al. | 709/223 |
| 6,330,600 B1 | * | 12/2001 | Matchefts et al. | 709/223 |

FOREIGN PATENT DOCUMENTS

JP 9-330203 12/1997

* cited by examiner

Primary Examiner—David Wiley
Assistant Examiner—Joseph E. Avellino
(74) Attorney, Agent, or Firm—Katten Muchin Zavis Rosenman

(57) ABSTRACT

A supervisory control system which can quickly and accurately transmit supervisory control information of a supervised apparatus is provided. This supervisory control apparatus includes a cache storage unit which caches response information to be sent as cache information to a supervisory control terminal, and a cache management unit which manages cumulated cache information. The cache management unit caches the response information of a supervised apparatus designated by a supervisory control request from the supervisory control terminal. When the response information corresponding to the supervisory control request from the supervisory control terminal exists as cache information in the cache storage unit, the cache management unit transmits the cache information to the supervisory control terminal. When the response information does not exist in the cache storage unit, the cache management unit issues a supervisory control instruction to obtain response information to the designated supervised apparatus, and transmits the newly obtained response information to the supervisory control terminal.

8 Claims, 10 Drawing Sheets

FIG. 5

```
<HTML><HEAD>
<TITLE> UNIT SETTING </TITLE>
</HEAD>
<BODY>
<H2> UNIT SETTING </H2>
<FORM ACTION="../cgi-bin/analyzer unit 1" METHOD="post">
  <SELECT NAME="NODE">
    <OPTION VALUE="apparatus 1"> APPARATUS 1
    <OPTION VALUE="apparatus 2"> APPARATUS 2
  </SELECT>
  <INPUT TYPE="TEXT" SIZE="2" NAME=UNIT-NO><BR>
  <INPUT TYPE="HIDDEN" NAME="DEL-CACHE" VALUE="unit reading">
  <INPUT TYPE="HEDDEN" NAME="CACHE" VALUE="">
  <INPUT TYPE="HEDDEN" NAME="USE-CACHE" VALUE="">
  <INPUT TYPE="submit" VALUE="send">
</FORM>
</BODY>
</HTML>
```

FIG. 6

```
<HTML><HEAD>
<TITLE> UNIT READING </TITLE>
</HEAD>
<BODY>
<H2> UNIT SETTING </H2>
<FORM ACTION="../cgi-bin/analyzer unit 2" METHOD="post">
    <SELECT NAME="NODE">
        <OPTION VALUE="apparatus 1"> APPARATUS 1
        <OPTION VALUE="apparatus 2"> APPARATUS 2
    </SELECT>
    <INPUT TYPE="TEXT" SIZE="2" NAME=UNIT-NO"><BR>
    <INPUT TYPE="HIDDEN" NAME="DEL-CACHE" VALUE="">
    <INPUT TYPE="HEDDEN" NAME="CACHE" VALUE="unit reading">
    <INPUT TYPE="HEDDEN" NAME="USE-CACHE" VALUE="unit reading">
    <INPUT TYPE="submit" VALUE="send">
</FORM>
</BODY>
</HTML>
```

SUPERVISORY CONTROL SYSTEM

BACKGROUND OF THE INVENTION

1. Field of the Invention

The present invention generally relates to supervisory control systems, and more particularly, to a supervisory control system which uses a cache function in a server system on the World Wide Web (WWW), or the like, to cache response information.

2. Description of the Related Art

FIG. 1 shows a conventional supervisory control system. In this supervisory control system, a supervisory control apparatus 12 supervises and controls a plurality of supervised apparatuses 13 via a supervisory control network. This supervisory control apparatus 12 is connected to supervisory control terminals 11 each having a browser function by a LAN (the supervisory control terminals 11 will be hereinafter referred to as "browsers 11"). The supervisory control apparatus 12 performs HTTP (Hyper Text Transfer Protocol) communication with the browsers 11 using a Web server function. The supervisory control apparatus 12 analyzes a control request (a supervisory control request) sent from the browsers 11, and then issues a command to the supervised apparatuses 13, thereby supervisory-controlling the supervised apparatuses 13. Response information sent from the supervised apparatuses 13 in reply is supplied to the browsers 11, which display the contents of the received response information.

The conventional supervisory control apparatus 12 using the Web server issues a command to the supervised apparatuses 13 to inquire for the supervisory control conditions every time a control request is sent by a browser 11 even for response information which does not change with time. Accordingly, every time a supervisory control request is made from a browser, the supervisory control apparatus 12 receives the corresponding response information from the supervised apparatuses 13 and transfers it to the browser. However, a larger amount of response information received from the supervised apparatuses 13 takes the supervisory control apparatus 12 longer to transfer it to the browser 11. This causes the browser 11 a delay in displaying the page.

Meanwhile, the Web server of the supervisory control apparatus 12 has a cache function. Upon receipt of supervisory information from the supervised apparatuses 13, the Web server with the cache function transfers the supervisory information to the browsers 11 and caches the supervisory information in a cache memory. When one of the browsers 11 inquires again for the same supervisory information, supervisory control apparatus 12 can read out the supervisory information from the cache memory and send it, instead of inquiring directly to the supervised apparatuses 13.

The response information from the supervised apparatuses 13 includes not only the information that does not change with time but also information which changes every time a page is displayed on a browser 11. In the prior art, each browser 11 has no means to judge whether response information sent from the supervisory control apparatus 12 is information obtained by inquiring directly from the supervised apparatuses 13 or cache information read out from the cache memory. As a result, response information not reflecting the current conditions of the supervised apparatuses 13 is sent to the browser 11. Also, the operator of the browser 11 may wrongly use information because he/she cannot judge whether the contents of a page displayed on the browser 11 are cache information or information obtained directly from the supervised apparatus 13.

SUMMARY OF THE INVENTION

A general object of the present invention is to provide supervisory control systems in which the above disadvantages are eliminated.

A more specific object of the present invention is to provide a supervisory control system which can quickly and accurately obtain supervisory control information from supervised apparatuses.

The above objects of the present invention are achieved by a supervisory control system which comprises a supervisory control apparatus, one or more supervised apparatuses connected to the supervisory control apparatus via a network, and a plurality of supervisory control terminals connected to the supervisory control apparatus via a network. The supervisory control apparatus issues a supervisory control instruction to the one or more supervised apparatuses upon receipt of a control request from a supervisory control terminal querying one or more supervised apparatuses, and supplies the supervisory control terminal with response information received as a response from the one or more supervised apparatuses.

In the above supervisory control apparatus, there are provided a cache storage unit which caches response information as cache information to be sent to one or more supervisory control terminals, and a cache management unit which manages cache information stored in the cache storage unit.

The supervisory control apparatus caches cache information in the cache storage unit. This cache information is the response information from a supervised apparatus in response to a supervisory control request from the supervisory control terminal. When the response information corresponding to the supervisory control request from the supervisory control terminal exists as cache information in the cache storage unit, the supervisory control apparatus then transmits the cache information to the supervisory control terminal. When the response information corresponding to the supervisory control request from the supervisory control terminal does not exist in the cache storage unit, the supervisory control apparatus issues a supervisory control instruction to the designated supervised apparatus to obtain response information, and transfers the thus obtained response information to the supervisory control terminal.

By determining whether response information from a supervised apparatus should be cached in the cache storage unit in accordance with a supervisory control request from the supervisory control terminal, only designated response information will be cached in the cache storage unit. Accordingly, in reply to a supervisory control request for response information which does not change with time, the supervisory control apparatus can promptly send the corresponding cache information to the supervisory control terminal. Meanwhile, response information which changes with the operating conditions of the supervised apparatuses is not cached in the cache storage unit. Thus, only highly reliable response information is sent to the supervisory control terminal.

The above and other objects and features of the present invention will become more apparent from the following description taken in conjunction with the accompanying drawings.

BRIEF DESCRIPTION OF THE DRAWINGS

FIG. 5 shows an example control request page in the HTML at a time of "unit setting";

FIG. 6 shows an example control request page in the HTML at a time of "unit reading";

DESCRIPTION OF THE PREFERRED EMBODIMENTS

The following is a description of embodiments of the present invention, with reference to the accompanying drawings.

Figure 1:
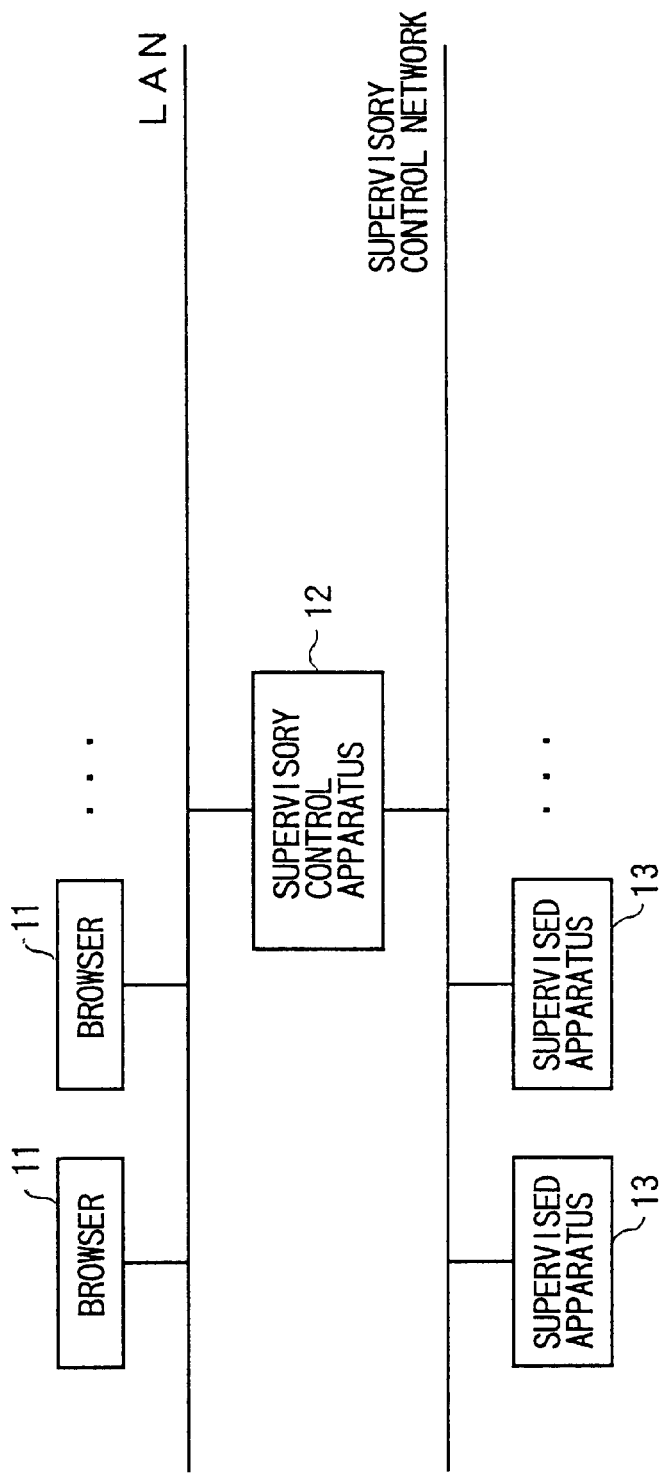
FIG. 1 shows the structure of a supervisory control network.
Figure 2:
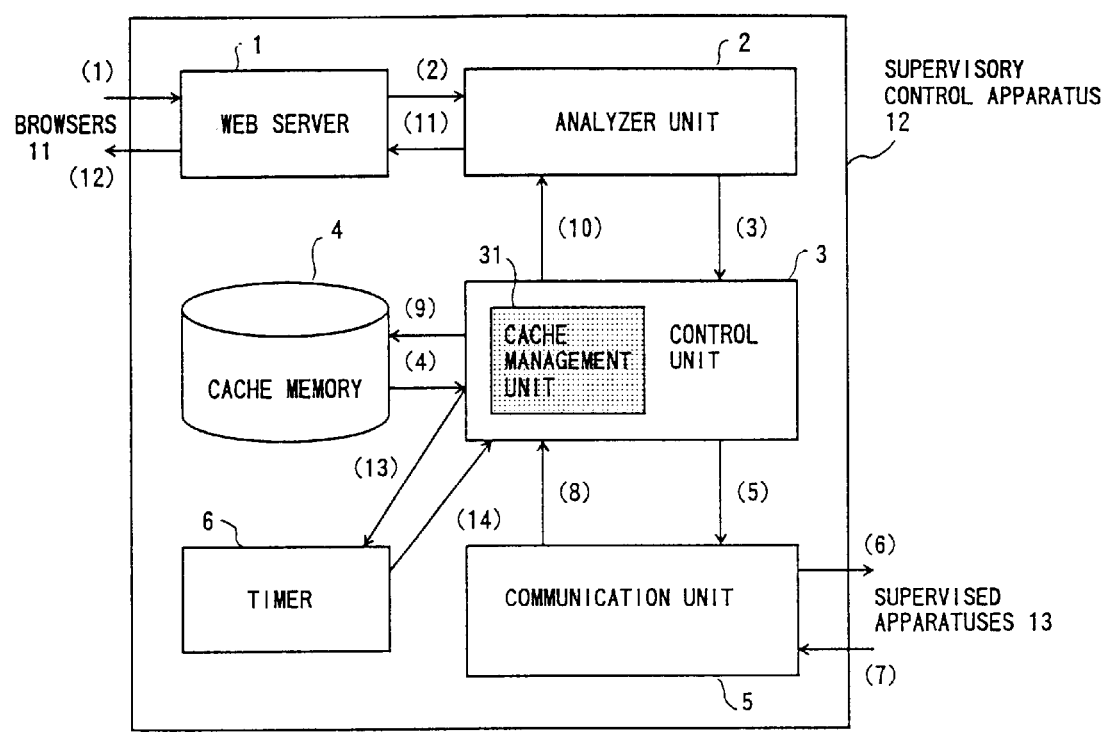
FIG. 2 shows the structure of a supervisory control apparatus of one embodiment of the present invention.

FIG. 2 is a block diagram showing the structure of a supervisory control apparatus of one embodiment of the present invention. This supervisory control apparatus can be applied to a supervisory control network which has the same structure as the supervisory control network shown in FIG. 1. The supervisory control apparatus 12 comprises a WEB server 1, an analyzer unit 2, a control unit 3, a cache memory 4, a communication unit 5, and a timer 6. The supervisory control apparatus 12 is connected to browsers 11 via a LAN (Local Area Network), and to supervised apparatuses 13 via a supervisory control network.

The WEB server 1 performs communication using the browsers 11 and an HTTP (Hyper Text Transfer Protocol). The WEB server 1 activates the analyzer unit 2 designated by a control request notification (1) from the browsers 11, and also transmits a response information notification (12) to the browsers 11 by the HTTP. Here, the response information notification (12) is originally a response information notification (11) in HTML (Hyper Text Markup Language) outputted by the analyzer unit 2.

The analyzer unit 2 analyzes the contents of a request (2) when a supervisory control request is made by the control request notification (1) sent from the browsers 11. The analyzer unit 2 then sends a control request (3) to the control unit 3. When receiving response information (10) from the control unit 3, the analyzer unit 2 converts the contents of the response (including the response time as described later) into a notification in the HTML, and outputs it as the response information notification (11) to the Web server 1.

The control unit 3 produces a control frame (a supervisory control frame) for the supervised apparatuses 13 in accordance with the control request (3) from the analyzer unit 2, and sends a control frame transmission request (5) to the communication unit 5. The control unit 3 also converts a response frame notification (8) received from the communication unit 5 into characters, and sends them as the response information (10) to the analyzer unit 2. The control unit 3 is provided with a cache management unit 31 which stores, retrieves, and deletes cache information in the cache memory 4. The functions of the cache management unit 31 will be described later in detail.

The cache memory 4 stores response information (including the response time) as cache information supplied from the supervised apparatuses 13. In compliance with instructions from the cache management unit 31, the cache memory 4 reads, writes, rewrites, and deletes the cache information.

The communication unit 5 performs communication with the supervised apparatuses 13. Upon receipt of the control frame transmission request from the control unit 3, the communication unit 5 transmits the control frame as a transmission frame (6) to the supervised apparatuses 13. Also, the communication unit 5 receives a response frame (7) from the supervised apparatuses 13, and sends it as the response frame notification (8) to the control unit 3.

The timer 6 is used in a regular operation of the cache memory 4 explained later. In accordance with a timer set instruction (13) from the cache management unit 31, the timer 6 awaits for a predetermined period of time, and then sends a timeout notification (14) to the cache management unit 31.

Figure 3:
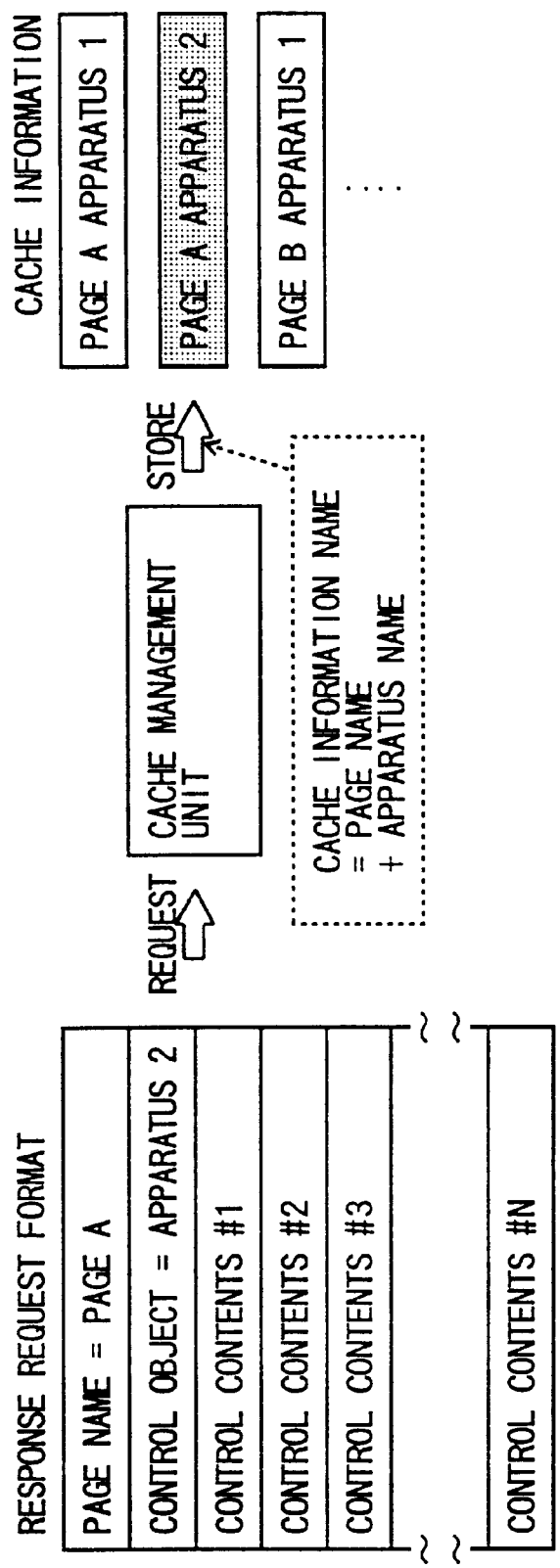
FIG. 3 shows an example method of managing the caching operation when the supervisory control apparatus stores cache information.
Figure 4:
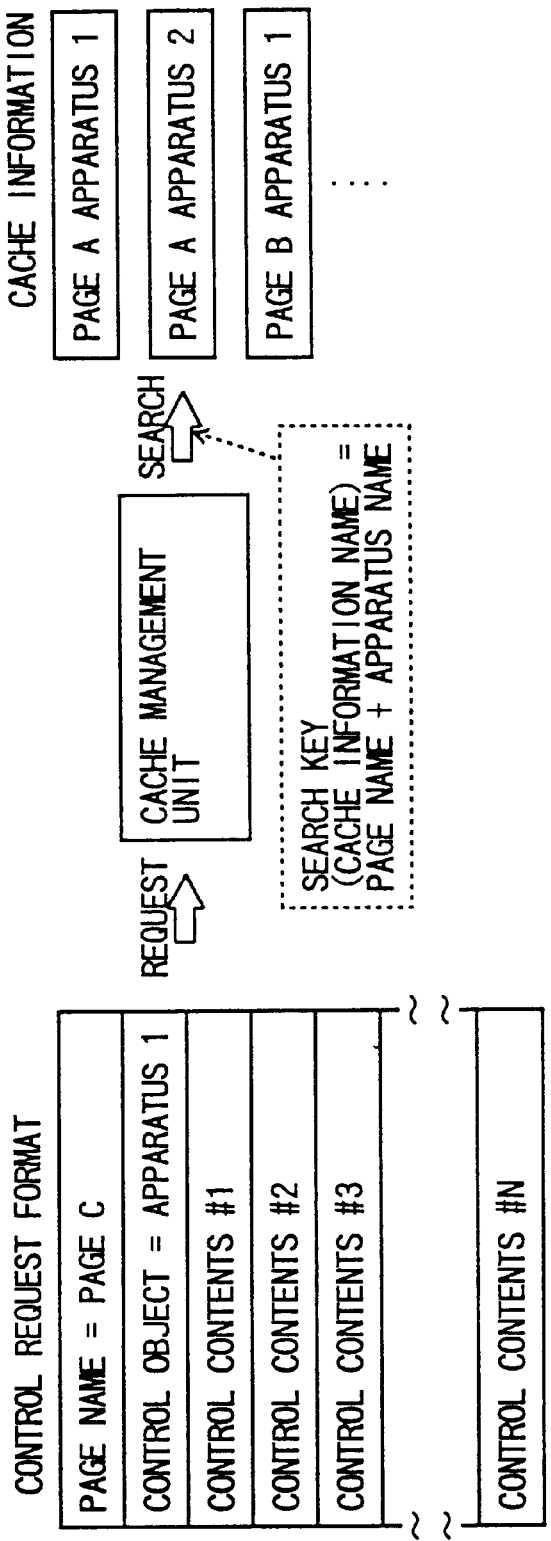
FIG. 4 shows an example method of managing the cache operation when the supervisory control apparatus retrieves cache information.

FIGS. 3 and 4 show a method of the cache management unit 31 used in managing the cache information. More specifically, FIG. 3 shows a method used by the cache management unit 31 for storing a response frame (a response request notification) received from the supervised apparatuses 13 as the cache information in the cache memory 4. FIG. 4 shows a method used by the cache management unit 31 for retrieving the cache information from the cache memory 4 in accordance with the control request notification received from the browsers 11.

In the method shown in FIG. 3, the cache management unit 31 stores the cache information in the cache memory 4, using a "cache information name" consisting of a "control request page (or control request notification) name" and a "supervised apparatus name" as an index. Here, the cache information includes response information and the time of the receipt of the response information.

The method shown in FIG. 4 is used to retrieve the cache information corresponding to an object to be deleted or controlled. In this embodiment, there is a control result from the cache management unit 31. The "cache information name" made up of the "control request page name" and the "supervised apparatus name" in the contents of the control request is used to retrieve the corresponding cache information.

In this embodiment, the caching is carried out for each page instead of each command. In FIGS. 3 and 4, N control contents (control commands) can be designated, but a piece of the cache information is produced in response to a request on the control request page. Retrieving the cache information in accordance with the "cache information name" eliminates the necessity of comparing all the data of the cache information, thereby increasing the efficiency of the retrieving operation.

FIGS. 5 and 6 show example control request notifications (control request pages) sent from the browsers 11. More specifically, FIG. 5 is an example control request page of "unit setting", and FIG. 6 is an example control request page of "unit reading". The parameters shown in each of the pages are as follows.

NAME="NODE" (apparatus name): the name of an apparatus to be supervised (a supervised apparatus).

NAME="DEL-CACHE" (cache delete): the name of cache information to be deleted from the cache memory 4 (i.e., the name of a control request page). If the "DEL-CACHE" is null (" ") the corresponding cache information is not to be deleted.

NAME="CACHE" (cache designation): the name of response information to be cached as cache information in the cache memory 4 (i.e., the name of a control request page which instructs to obtain the response information). If the "CACHE" is null (" "), the response information obtained from the supervised apparatuses 13 in accordance with the control request page is not to be cached.

NAME="USE-CACHE" (cache effective): the name of cache information for instructing to notify the browsers 11 of the cache information as response information stored in the cache memory 4. If the "USE-CACHE" indicates a cache information name, it means the cache information is effective (i.e., the cache information is used as the response information). If the "USE-CACHE" is null (" "), cache information in the cache memory 4 is not used, and a command to provide response information is issued to the supervised apparatuses 13.

NAME="UNIT-NO": a unit number indicating the parameters for "unit setting" and "unit reading". The number varies with the contents of control requests.

Referring now to FIGS. 7 to 10, the cache management operation by the cache management unit 31 will be described.

Figure 7:
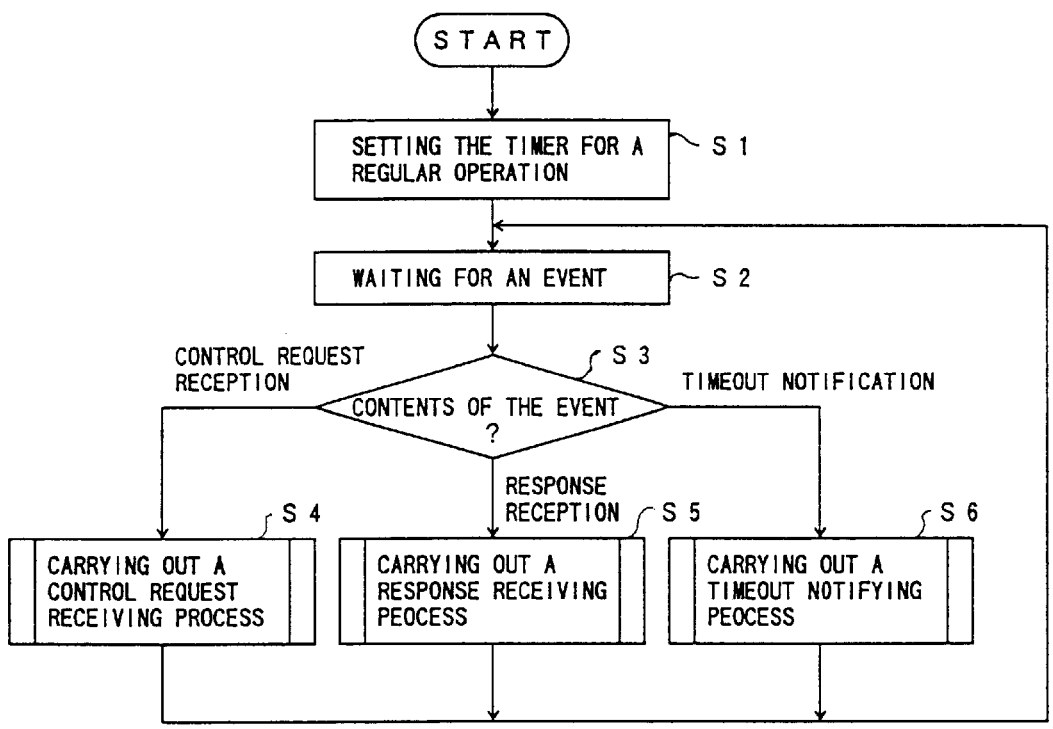
FIG. 7 is a flowchart showing a main routine of a cache management operation carried out by a cache management unit of the supervisory control apparatus.

Firstly, FIG. 7 shows the main routine of the cache management operation by the cache management unit 31. As shown in the flowchart, the cache management unit 31 issues a timer set instruction for the regular operation to the timer 6 in a step S1. The cache management unit 31 then waits for an event in a step S2. The event here may be "control request reception" from the browsers 11, "response information reception" from the supervised apparatuses 13, or "timeout notification" from the timer 6. Upon receipt of the event, the cache management unit 31 determines the contents of the event in a step S3, and performs suitable operations in steps S4 to S6.

Figure 8:
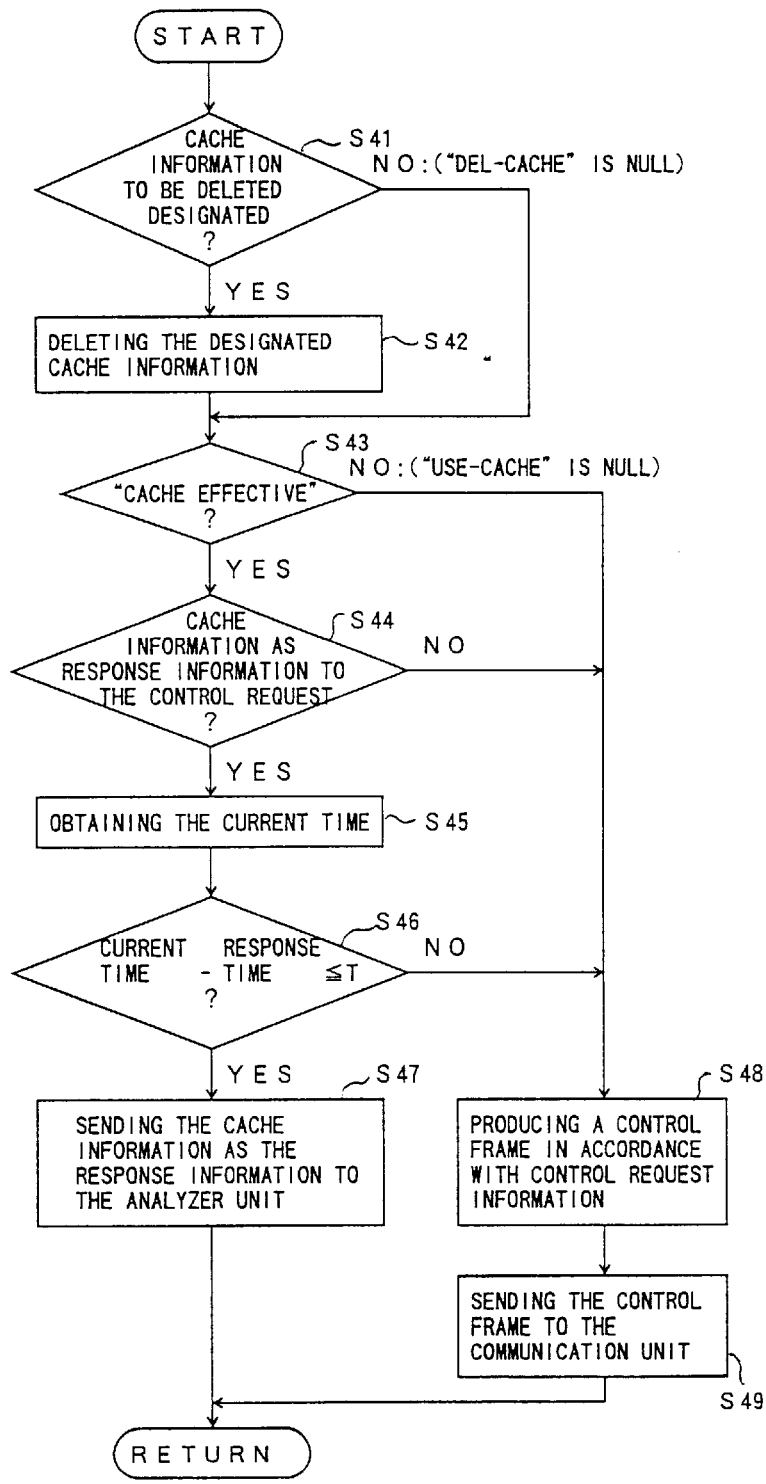
FIG. 8 is a flowchart showing "control request reception" procedures in the main routine carried out by the cache management unit of the supervisory control apparatus.

FIG. 8 is a flowchart of the operation carried out in a case where the received event is the "control request reception". Firstly, in a step S41, the cache management unit 31 determines whether the "cache delete (DEL-CACHE)" is indicated in the control request, i.e., whether cache information to be deleted is designated in the control request. If there is designated cache information, the cache management unit 31 deletes the corresponding cache information in the cache memory 4 in a step S42. If no cache information is designated, the cache management unit 31 moves on to the next step.

This "cache delete" process is carried out when the supervisory control information provided by the supervised apparatuses 13 varies with received control requests. It is unnecessary to cache response information (supervisory control information) which varies with time, because storing such information causes wrong information to be transmitted. Therefore, such response information should be deleted in advance. Such response information is directly obtained from the supervised apparatuses 13 when there is a control request to obtain the response information.

In a step S43, the cache management unit 31 next determines whether the "cache effective (USE-CACHE)" is indicated in the control request. If there is no "cache effective" indication, i.e., if the "USE-CACHE" is null (" ") the response information corresponding to the control request is to be obtained directly from the supervised apparatuses 13. Therefore, the cache management unit 31 fabricates a control frame in accordance with the contents of the control request in a step S48, and then sends a control frame transmission request to the communication unit 5 in a step S49. In reply to this, the communication unit 5 transmits a control frame (i.e., a command) to the supervised apparatuses 13 so as to obtain the response information from the supervised apparatuses 13.

If the "cache effective" is indicated in the step S43, the cache management unit 31 searches the cache memory 4 for the cache information as a response to the control request in a step S44. If the cache information does not exist in the cache memory 4 (for instance, if cache information has already been deleted), the cache management unit 31 moves on to the step S48 to obtain the response information directly from the supervised apparatuses 13. If the cache information exists in the cache memory 4, the cache management unit 31 obtains the current time in a step S45, and compares the current time with the response time in a step S46. The response time is the time when the cache management unit 31 receives the response information. If the time difference obtained from the comparison is equal to or shorter than a predetermined period of time T, the cache management unit 31 sends the cache information as the response information to the analyzer unit 2 in a step S47. If the time difference is longer than the predetermined period of time T, the cache management unit 31 moves on to the step S48 to obtain the response information directly from the supervised apparatuses 13. When the predetermined period of time T has passed since the previous response time, the cache information is judged to be too old to be reliable, and therefore it is necessary to obtain new response information directly from the supervised apparatuses 13.

In the "control request receptions" process, cache information to be deleted is designated, so that the cache information corresponding to response information whose contents have been changed can be deleted in advance. When the browsers 11 make a control request to obtain response information that is no longer in the cache memory 4, the latest information is automatically obtained from the supervised apparatuses 13.

If a predetermined period of time has already passed since cache information was obtained, a command is issued to the supervised apparatuses 13 to obtain the corresponding response information, regardless of whether the cache information exists in the cache memory 4 or not. Thus, an operator can automatically obtain the latest information.

In a case where the response information corresponding to the control request and the response time is within the predetermined time T, no command is issued to the supervised apparatuses 13 to obtain the response information. As a result, the cache information in the cache memory 4 is returned as the response information, thereby making the response quicker. Furthermore, as the response time included in the response information is also displayed by the browsers 11, an operator can recognize the time of generation of the response information. Thus, the contents of the displayed information can gain higher credibility.

Figure 9:
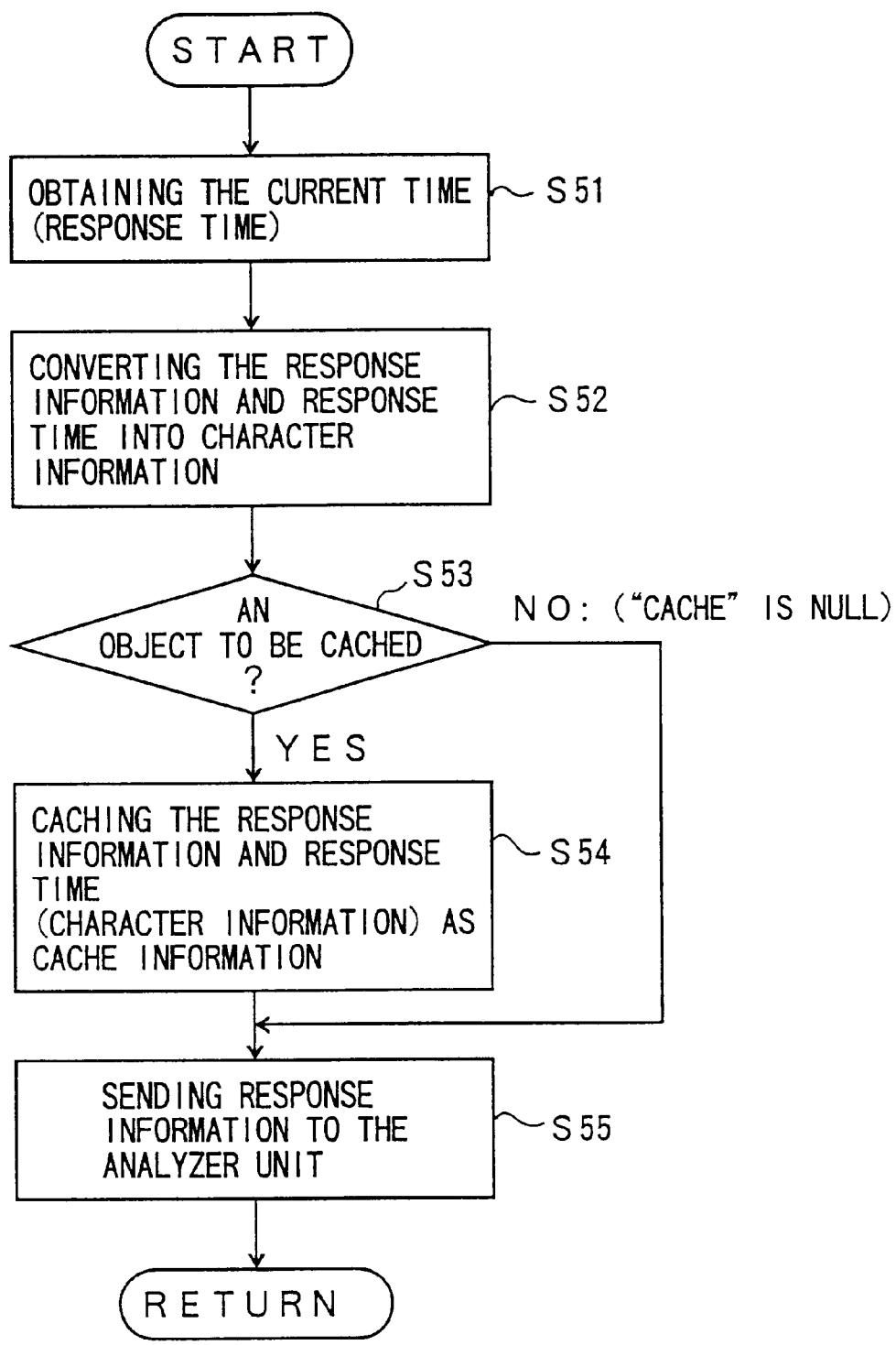
FIG. 9 is a flowchart showing "response information reception" procedures in the main routine carried out by the cache management unit of the supervisory control apparatus.

FIG. 9 is a flowchart of the operation carried out in a case where the received event is "receiving response information" from the supervised apparatuses 13. Upon receipt of response information, the cache management unit 31 first obtains the current time as a response time (or a reception time) in a step S51. The cache management unit 31 the converts the response information and the response time into character information in HTML in a step S52. In a step S53, the cache management unit 31 refers to the control request for the response information, and determines whether the response information is indicated as "cache designation" in the control request. If the response information is indicated as an object to be cached, the cache management unit 31 stores the cache information (character information) made up of the response information and the response time in the cache memory 4 with the "cache information name" in a step S54. If the response information is not an object to be cached, the cache management unit 31 returns to the event waiting step (the step S2) of the main routine. In either case, the response information and the response time are sent to the browsers 11.

Figure 10:
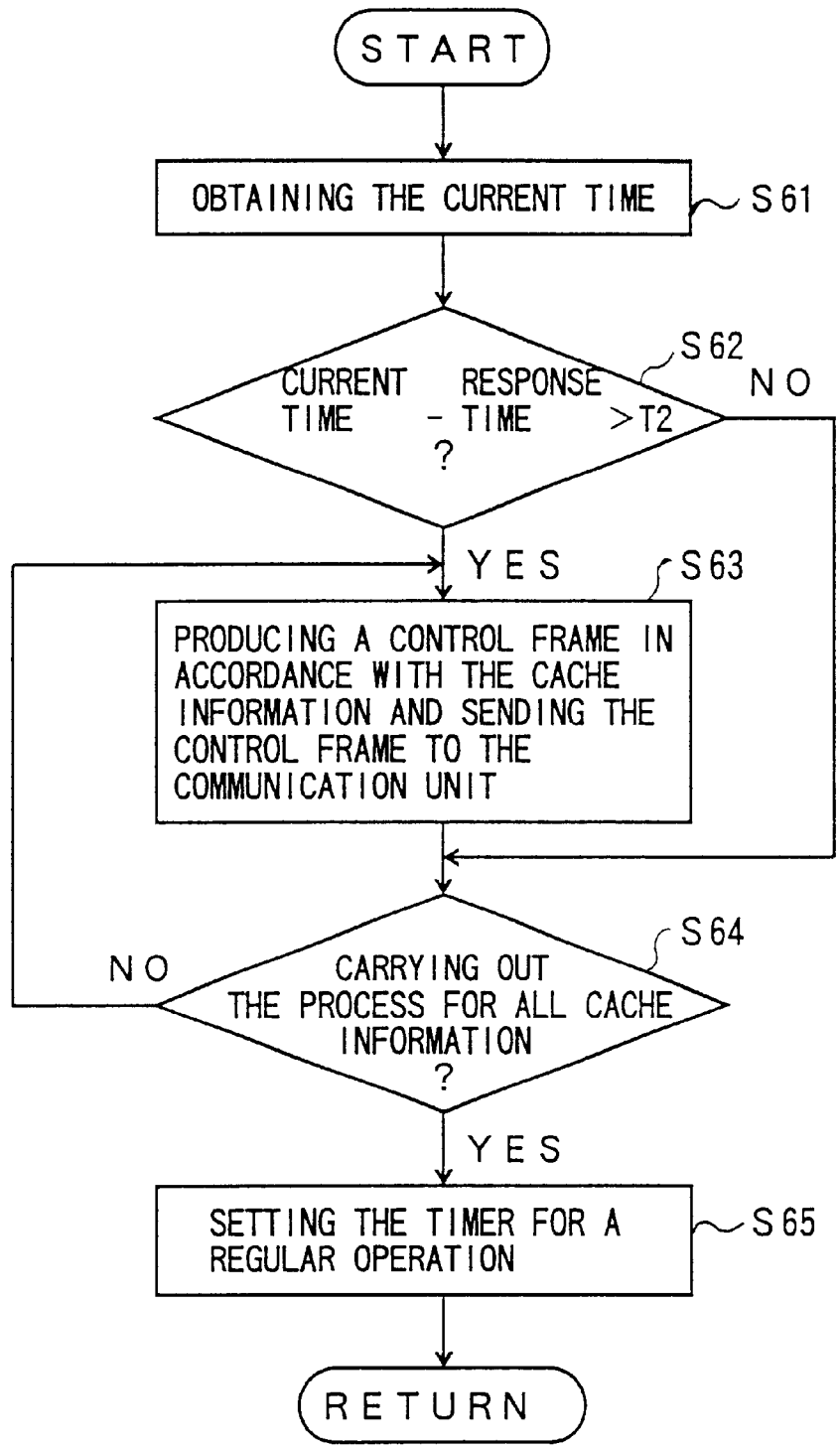
FIG. 10 is a flowchart showing "regular operation" procedures in the main routine carried out by the cache management unit of the supervisory control apparatus.

FIG. 10 is a flowchart of a "regular operation" carried out in a case where a timeout notification is sent from the timer 6. Upon receipt of a timeout notification, the cache management unit 31 first obtains the current time in a step S61. The cache management unit 31 then fetches cache information from the cache memory 4, and compares the response time of the cache information with the current time in a step S62. If a predetermined period of time T2 or more has passed since the response time, the cache information is judged to be too old to be reliable. To update the cache information, the cache management unit 31 fabricates a control frame to obtain response information corresponding to the cache information from the supervised apparatuses 13, and sends a control frame transmission request to the communication unit 5 in a step S63. Upon receipt of the response information from the supervised apparatuses 13, the cache management unit 31 performs the "response information reception" process to update the cache information in the cache memory 4. In the "regular operation", the cache management unit 31 does not send the received response information to the browsers 11. If the time difference between the response time and the current time is shorter than the predetermined period of time T2, the cache information updating step (the step S63) is skipped. In a step S64, the cache management unit 31 repeats the above procedures for all the cache information stored in the cache memory 4. In a step S65, the cache management unit 31 instructs the timer 6 to set its timing again for the regular operation, and returns to the event waiting step (the step S2).

By the above procedures, if the time difference between a response time and a current time is longer than a predetermined period of time, the cache information stored in the cache memory 4 can be automatically updated to the latest information obtained from the supervised apparatuses 13. This eliminates the need to obtain new response information from the supervised apparatuses 13 when the browsers 11 make a control request to obtain the response information. Accordingly, the time required to response to the browsers 11 can be shortened.

Referring back to FIGS. 5 and 6, the control request pages will be described in detail. As mentioned before, FIG. 5 is an example control request page of "unit setting", and FIG. 6 is an example control request page of "unit reading". When a "unit setting" operation is performed in the supervised apparatuses 13, the contents of response information obtained by the operation will be different from the contents of response information read out by the "unit reading" operation in the supervised apparatuses 13 in compliance with a "unit reading" control request.

The title of the control request page shown in FIG. 5 is "unit setting", and the selected apparatuses to be supervised (SELECT NAME=NODE) are apparatuses 1 and 2. When carrying out the "unit setting", the cache management unit 31 should delete the cache information to be returned in the "unit reading" from the cache memory 4. Therefore, the "cache information name" of an object to be deleted is indicated as "unit reading" by a control command:

NAME="DEL-CACHE" VALUE="unit reading".

Since the response information from the supervised apparatuses 13 in reply to the control request of the "unit setting" changes with the conditions of the supervised apparatuses 13, there is no need to cache the response information from the supervised apparatuses 13 in reply to the control request of the "unit setting". Therefore, the received response information is not cached in the cache memory 4 in compliance with a control command:

NAME="CACHE" VALUE=" "

Likewise, when a command to obtain information directly from the supervised apparatuses 13 is issued, it is not necessary to retrieve cache information. Therefore, the cache information is not retrieved from the cache memory 4 in compliance with a control command:

NAME="USE-CACHE" VALUE=" "

Referring now to FIG. 6, the control request page is titled "unit reading", and is used to read out "unit information (status information concerning a designated unit)" from the supervised apparatuses 13. The supervised apparatuses 13 here are designated as apparatuses 1 and 2 (NAME=NODE). The "unit information" is set once in the supervised apparatuses 13 in accordance with a "unit setting" control request, the contents of which do not change unless another "unit setting" control request is made. Accordingly, it is not necessary to issue a command to the supervised apparatuses 13 to obtain unit information every time a page is displayed upon receipt of the "unit reading" control request. In this case, caching unit information in the cache memory 4 is more efficient.

In view of this, the "cache information name" to be cached in the cache memory 4 is designated as "unit reading" by a control command:

NAME="CACHE" VALUE 32 "unit reading"

When the appropriate cache information exists in the cache memory 4, the cache information is to be returned as response information. Accordingly, the "cache information name" to be searched for in the cache memory 4 is also designated as "unit reading" by a control command:

NAME="USE-CACHE" VALUE="unit reading"

Since the conditions of the supervised apparatuses 13 do not change by the "unit reading" command, the cache information is not to be deleted by a control command:

NAME="DEL-CACHE" VALUE=" "

By displaying the parameters in HTML as described above, a change to the parameters can be easily made.

Various changes and modifications are possible in the embodiment of the present invention. In the embodiment described so far, it is the browsers 11 that make a control request as to whether response information should be cached as cache information, whether cache information cached in the cache memory should be used, and whether cache information should be deleted. However, it is also possible for the supervisory control apparatus 12 to have a table of instructions for cache information, and refer to the table upon receipt of a control request from the browsers 11 so as to perform a suitable operation based on a corresponding instruction in the table.

The present invention is not limited to the specifically disclosed embodiments, but variations and modifications may be made without departing from the scope of the present invention.

The present application is based on Japanese priority application No. 11-039651, filed on Feb. 18, 1999, the entire contents of which are hereby incorporated by reference.

What is claimed is:

1. A supervisory control system comprising:

a supervisory control apparatus;

one or more supervised apparatuses connected to the supervisory control apparatus via a network; and a supervisory control terminal connected to the supervisory control apparatus via a network, wherein: the supervisory control apparatus issues a supervisory control instruction to the one or more supervised apparatuses upon receipt of a control request from the supervisory control terminal to supervise the one or more supervised apparatuses, and supplies the supervisory control terminal with response information received as a response from the one or more supervised apparatuses;

the supervisory control apparatus comprises a cache storage unit which caches response information as cache information to be sent to the supervisory control terminal, and a cache management unit which manages cache information stored in the cache storage unit; and the supervisory control apparatus caches cache information in the cache storage unit, the cache information being response information of a supervised apparatus designated by a supervisory control request from the supervisory control terminal, transmits that cache information to the supervisory control terminal when the response information corresponding to the supervisory control request from the supervisory control terminal exists as cache information in the cache storage unit, and issues a supervisory control instruction to the designated supervised apparatus to obtain response information and transmits the thus obtained response information to the supervisory control terminal when the response information corresponding to the supervisory control request from the supervisory control terminal does not exist in the cache storage unit;

wherein the supervisory control apparatus only caches response information designated as cache information by the supervisory control request.

2. The supervisory control system as claimed in claim 1, wherein in accordance with the supervisory control request from the supervisory control terminal, the cache information cumulated in the cache storage unit is returned to the supervisory control terminal as a notification, or a supervisory control instruction to obtain response information is forcibly issued to the designated supervised apparatus and the obtained response information is returned to the supervisory control terminal regardless of whether the cache information corresponding to the supervisory control request exists in the cache storage unit.

3. The supervisory control system as claimed in claim 1, wherein cache information to be deleted is selected from the cumulated cache information in the cache storage unit in accordance with the supervisory control request from the supervisory control terminal.

4. The supervisory control system as claimed in claim 1, wherein the time of obtaining response information is added as a response time to the cache information.

5. The supervisory control system as claimed in claim 4, wherein:

the supervisory control instruction to obtain response information is issued to the designated supervised apparatus when the time difference between the time of obtaining cache information and the response time in the cache information is equal to or longer than a predetermined period of time; and the cache information is updated by the newly obtained response information.

6. The supervisory control system as claimed in claim 4, wherein:

the supervisory control instruction to obtain response information is issued to the designated supervised apparatus when the time difference between the time of obtaining cache information and the response time in the cache information is equal to or longer than a predetermined period of time;

the newly obtained response information is sent to the supervisory control terminal; and the cache information is updated by the newly obtained response information.

7. The supervisory control system as claimed in claim 1, wherein cache information is stored or retrieved by names defined by each supervisory control request including a plurality of commands from the supervisory control terminal.

8. A supervisory control apparatus used in a supervisory control system comprising:

a supervisory control apparatus;

one or more supervised apparatuses connected to the supervisory control apparatus via a network; and a supervisory control terminal connected to the supervisory control apparatus via a network, wherein: the supervisory control apparatus issues a supervisory control instruction to the one or more supervised apparatuses upon receipt of a control request from the supervisory control terminal to supervise the one or more supervised apparatuses, and supplies the supervisory control terminal with response information received as a response from the one or more supervised apparatuses;

the supervisory control apparatus comprises a cache storage unit which caches response information as cache information to be sent to the supervisory control terminal, and a cache management unit which manages cache information stored in the cache storage unit; and the supervisory control apparatus caches cache information in the cache storage unit, the cache information being response information from a supervised apparatus designated by a supervisory control request from the supervisory control terminal, transmits the cache information to the supervisory control terminal when the response information corresponding to the supervisory control request from the supervisory control terminal exists as cache information in the cache storage unit, and issues a supervisory control instruction to the designated supervised apparatus to obtain response information and transmits the thus obtained response information to the supervisory control terminal when the response information corresponding to the supervisory control request from the supervisory control terminal does not exist in the cache storage unit;

wherein the supervisory control apparatus only caches response information designated as cache information by the supervisory control request.

* * * * *